(12) United States Patent
Kim et al.

(10) Patent No.: US 8,565,268 B2
(45) Date of Patent: Oct. 22, 2013

(54) METHOD FOR GENERATING REFERENCE SIGNAL SEQUENCE IN MULTI-ANTENNA WIRELESS COMMUNICATION SYSTEM AND APPARATUS FOR SAME

(75) Inventors: Bong Hoe Kim, Anyang-si (KR); Byeong Woo Kang, Anyang-si (KR); Dae Won Lee, Anyang-si (KR); Yu Jin Noh, Anyang-si (KR); Ki Jun Kim, Anyang-si (KR); Dong Wook Roh, Anyang-si (KR)

(73) Assignee: LG Electronics Inc., Seoul (KR)

( * ) Notice: Subject to any disclaimer, the term of this patent is extended or adjusted under 35 U.S.C. 154(b) by 186 days.

(21) Appl. No.: 13/265,515

(22) PCT Filed: Apr. 29, 2010

(86) PCT No.: PCT/KR2010/002710
§ 371 (c)(1),
(2), (4) Date: Oct. 20, 2011

(87) PCT Pub. No.: WO2010/126316
PCT Pub. Date: Nov. 4, 2010

(65) Prior Publication Data
US 2012/0033540 A1    Feb. 9, 2012

Related U.S. Application Data

(60) Provisional application No. 61/173,950, filed on Apr. 29, 2009.

(30) Foreign Application Priority Data

Apr. 28, 2010 (KR) .................. 10-2010-0039486

(51) Int. Cl.
*H04W 56/00* (2009.01)

(52) U.S. Cl.
USPC ........ 370/491; 370/310.2; 370/328; 370/350; 370/500; 370/503; 455/422.1; 455/502; 375/355; 375/356; 375/359; 375/362

(58) Field of Classification Search
USPC .............. 370/310.2, 324, 328–339, 349, 350, 370/491, 500, 503–520; 455/422.1, 502; 375/355–376
See application file for complete search history.

(56) References Cited

U.S. PATENT DOCUMENTS

| 7,729,237 | B2 * | 6/2010 | Lee et al. | 370/208 |
| 8,050,220 | B2 * | 11/2011 | Lee et al. | 370/328 |
| 2009/0268910 | A1 * | 10/2009 | Liu et al. | 380/268 |
| 2012/0027110 | A1 * | 2/2012 | Han et al. | 375/260 |

FOREIGN PATENT DOCUMENTS

| KR | 1020080093319 | 10/2008 |
| WO | 2008/072899 | 6/2008 |
| WO | 2008/130051 | 10/2008 |

* cited by examiner

*Primary Examiner* — Hoon J Chung
(74) *Attorney, Agent, or Firm* — Lee, Hong, Degerman, Kang & Waimey

(57) ABSTRACT

The present application discloses a method in which a base station transmits a reference signal sequence in a wireless communication system. In detail, the method comprises the steps of: generating a pseudo-random sequence using a first m-sequence and a second m-sequence; generating the reference signal sequence using the pseudo-random sequence; and transmitting the reference signal to a mobile station via antenna ports different from one another. The second m-sequence has an initial value containing parameters for discriminating reference signal sequences among users.

12 Claims, 9 Drawing Sheets

(a) Control-plane protocol stack (b) User-plane protocol stack

METHOD FOR GENERATING REFERENCE SIGNAL SEQUENCE IN MULTI-ANTENNA WIRELESS COMMUNICATION SYSTEM AND APPARATUS FOR SAME

CROSS-REFERENCE TO RELATED APPLICATIONS

This application is the National Stage filing under 35 U.S.C. 371 of international application No. PCT/KR2010/002710, filed on Apr. 29, 2010, which claims the benefit of U.S. provisional application No. 61/173,950, filed on Apr. 29, 2009, and also claims the benefit of earlier filing date and right of priority to Korean Patent Application No. 10-2010-0039486, filed on Apr. 28, 2010, the contents of which are all hereby incorporated by reference herein in their entirety.

TECHNICAL FIELD

The present invention relates to a wireless communication system, and more particularly, to a method of generating a reference signal sequence in a multi-antenna wireless communication system and apparatus therefor.

BACKGROUND ART

Generally, MIMO (multi-input multi-output) is a method that uses a plurality of transmitting antennas and a plurality of receiving antennas. And, this method may be able to improve efficiency in transceiving data. In particular, a transmitting or receiving stage of a wireless communication system uses a plurality of antennas to increase capacity or enhance performance. In the following description, the MIMO may be called multiple antennas.

The MIMO technique does not depend on a single antenna path to receive one whole message. Instead, the MIMO technique completes data by putting fragments received via several antennas together. If the MIMO technique is adopted, a data transmission rate within a cell area having a specific size may be improved or a system coverage may be increased by securing a specific data transmission rate. Moreover, this technique may be widely applicable to a mobile communication terminal, a relay and the like. According to the MIMO technique, it may be able to overcome the transmission size limit of the related art mobile communication which used to use a single data.

FIG. 1 is a diagram for a configuration of a general MIMO communication system. $N_T$ transmitting antennas are provided to a transmitting stage, while $N_R$ receiving antennas are provided to a receiving stage. In case that each of the transmitting and receiving stages uses a plurality of antennas, theoretical channel transmission capacity is increased more than that of a case that either the transmitting stage or the receiving stage uses a plurality of antennas. The increase of the channel transmission capacity is in proportion to the number of antennas. Hence, a transmission rate is enhanced and frequency efficiency can be raised. Assuming that a maximum transmission rate in case of using a single antenna is set to $R_0$, the transmission rate in case of using multiple antennas may be theoretically raised by a result from multiplying the maximum transmission rate $R_0$ by a rate increasing rate $R_i$, as shown in Formula 1. In this case, $R_i$ is a smaller one of $N_T$ and $N_R$.

$$R_i=\min(N_T,N_R) \qquad \text{[Formula 1]}$$

For instance, in an MIMO communication system, which uses 4 transmitting antennas and 4 receiving antennas, it may be able to obtain a transmission rate 4 times higher than that of a single antenna system. After this theoretical capacity increase of the MIMO system has been proved in the middle of 90's, many ongoing efforts are made to various techniques to substantially improve a data transmission rate. And, theses techniques are already adopted in part as standards for the 3G mobile communications and various wireless communications such as a next generation wireless LAN and the like.

The trends for the MIMO relevant studies are explained as follows. First of all, many ongoing efforts are made in various aspects to develop and research information theory study relevant to MIMO communication capacity calculations and the like in various channel configurations and multiple access environments, radio channel measurement and model derivation study for MIMO systems, spatiotemporal signal processing technique study for transmission reliability enhancement and transmission rate improvement and the like.

In order to explain a communicating method in an MIMO system in detail, mathematical modeling can be represented as follows. Referring to FIG. 1, assume that $N_T$ transmitting antennas and $N_R$ receiving antennas exist. First of all, regarding a transmission signal, if there are $N_T$ transmitting antennas, $N_T$ maximum transmittable informations exist. Hence, the transmission information may be represented by the vector shown in Formula 2.

$$S=[S_1,S_2,\ldots,S_{N_T}]^T \qquad \text{[Formula 2]}$$

Meanwhile, transmission powers can be set different from each other for transmission information $S_1, S_2, \ldots, S_{N_T}$, respectively. If the transmission powers are set to $P_1, P_2, \ldots, P_{N_T}$, respectively, the transmission power adjusted transmission information can be represented as Formula 3.

$$\hat{s}=[\hat{s}_1,\hat{s}_2,\ldots,\hat{s}_{N_T}]^T=[P_1s_1,P_2s_2,\ldots,P_{N_T}s_{N_T}]^T \qquad \text{[Formula 3]}$$

And, $\hat{S}$ may be represented as Formula 4 using a diagonal matrix P of the transmission power.

$$\hat{s}=\begin{bmatrix} P_1 & & & 0 \\ & P_2 & & \\ & & \ddots & \\ 0 & & & P_{N_T} \end{bmatrix}\begin{bmatrix} s_1 \\ s_2 \\ \vdots \\ s_{N_T} \end{bmatrix}=Ps \qquad \text{[Formula 4]}$$

Let us consider a case of configuring $N_T$ transmitted signals $x_1, x_2, \ldots x_{N_T}$, which are actually transmitted, by applying a weight matrix W to a transmission power adjusted information vector $\hat{S}$. In this case, the weight matrix plays a role in properly distributing each transmission information to each antenna according to a transmission channel status and the like. The transmitted signals are set to $x_1, x_2, \ldots, x_{N_T}$, may be represented as Formula 5 using a vector X. In this case, $W_{ij}$ means a weight between an $i^{th}$ transmitting antenna and a $j^{th}$ information. And, the W may be called a weight matrix or a precoding matrix.

$$x=\begin{bmatrix} x_1 \\ x_2 \\ \vdots \\ x_i \\ \vdots \\ x_{N_T} \end{bmatrix} \qquad \text{[Formula 5]}$$

-continued $$= \begin{bmatrix} w_{11} & w_{12} & \cdots & w_{1N_T} \\ w_{21} & w_{22} & \cdots & w_{2N_T} \\ \vdots & & \ddots & \vdots \\ w_{i1} & w_{i2} & \cdots & w_{iN_t} \\ \vdots & & \ddots & \vdots \\ w_{N_T1} & w_{N_T2} & \cdots & w_{N_TN_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix}$$

$$= W\hat{s}$$

$$= WPs$$

Generally, a physical meaning of a rank of a channel matrix may indicate a maximum number for carrying different informations on a granted channel. Since a rank of a channel matrix is defined as a minimum number of the numbers of independent rows or columns, a rank of a channel is not greater than the number of rows or columns. For example by formula, a rank of a channel H (i.e., rank (H)) is limited by Formula 6.

$$\text{rank}(H) \leq \min(N_T, N_R) \qquad \text{[Formula 6]}$$

Meanwhile, each different information sent by MIMO technique may be defined as 'transport stream' or 'stream' only. This 'stream' may be called a layer. If so, the number of transport streams is unable to be greater than a channel rank, which is the maximum number for sending different informations. Hence, the channel matrix H may be represented as Formula 7.

$$\text{\# of streams} \leq \text{rank}(H) \leq \min(N_T, N_R) \qquad \text{[Formula 7]}$$

In this case, '# of streams' may indicate the number of streams. Meanwhile, it should be noted that one stream is transmittable via at least one antenna.

There may exist various methods for making at least one stream correspond to several antennas. This method may be described in accordance with a type of MIMO technique as follows. First of all, if one stream is transmitted via several antennas, it may be regarded as spatial diversity. If several streams are transmitted via several antennas, it may be regarded as spatial multiplexing. Of curse, such an intermediate type between spatial diversity and spatial multiplexing as a hybrid type of spatial diversity and spatial multiplexing may be possible.

DISCLOSURE OF THE INVENTION

Technical Problem

Based on the above-mentioned discussion, a method for a base station to transmit a reference signal in a multi-antenna wireless communication system and apparatus therefor may be proposed in the following description.

Technical Solution

To achieve these and other advantages and in accordance with the purpose of the present invention, as embodied and broadly described, a method of transmitting a reference signal sequence, which is transmitted by a base station in a wireless communication system, according to the present invention may include the steps of generating a pseudo-random sequence using a first m-sequence and a second m-sequence, generating the reference signal sequence using the pseudo-random sequence, and transmitting the reference signal to a mobile station via antenna ports different from one another, wherein the second m-sequence has an initial value containing a parameter for discriminating an inter-user reference signal sequence.

Preferably, the second m-sequence $x_2(n)$ is determined by $x_2(n+31)=(x_2(n+3)+x_2(n+2)+x_2(n+1)+x_2(n))\bmod 2$ and the initial value of the second m-sequence is defined by $c_{init}=\Sigma_{i=0}^{30} x_2(i) \cdot 2^i$. In particular, the $c_{init}$ is $k+(\lfloor n_s/2 \rfloor+1) \cdot (2N_{ID}^{cell}+1) \cdot 2^{16}$ (where the $n_s$ indicates a slot number in a radio frame, the $N_{ID}^{cell}$ indicates a cell ID, and the k indicates the parameter for discriminating the inter-user reference signal sequence).

More preferably, the parameter k for discriminating the inter-user reference signal sequence is signaled to the mobile station via a downlink physical control channel. And, the parameter k for discriminating the inter-user reference signal sequence may have a value set to 0 or 1.

Meanwhile, if the base station operates in CoMP (coordinated multi point) mode, the $N_{ID}^{cell}$ of the $c_{init}$ is an ID $(N_{ID}^{serving\,cell})$ of a serving cell or an ID $(N_{ID}^{MU})$ of a mobile station group.

To further achieve these and other advantages and in accordance with the purpose of the present invention, as embodied and broadly described, a base station in a wireless communication system according to another embodiment of the present invention may include a processor generating a pseudo-random sequence using a first m-sequence and a second m-sequence, the processor generating a reference signal sequence using the pseudo-random sequence and a transmitting module transmitting the reference signal to a mobile station via antenna ports different from one another, wherein the second m-sequence has an initial value containing a parameter for discriminating an inter-user reference signal sequence.

Advantageous Effects

According to an embodiment of the present invention, a mobile station may be able to effectively transmit a signal to a base station in a multi-antenna wireless communication system.

Effects obtainable from the present invention may be non-limited by the above mentioned effect. And, other unmentioned effects can be clearly understood from the following description by those having ordinary skill in the technical field to which the present invention pertains.

BEST MODE FOR INVENTION

Reference will now be made in detail to the preferred embodiments of the present invention, examples of which are illustrated in the accompanying drawings. The embodiments described in the following description may include the examples showing that the technical features of the present invention are applied to 3GPP system.

Although an embodiment of the present invention is exemplarily described in the present specification using the LTE system and the LTE-A system, the embodiment of the present invention may be also applicable to any kinds of communication systems corresponding to the above definitions. Although an embodiment of the present invention is exemplarily described with reference to FDD scheme in the present specification, the embodiment of the present invention is easily modifiable and applicable to H-FDD or TDD scheme.

Figure 1:
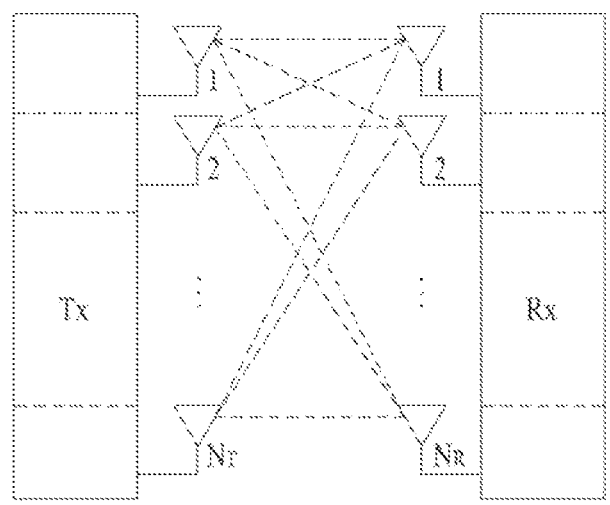
FIG. 1 is a diagram for a configuration of a general multi-antenna (MIMO) communication system.
Figure 2:
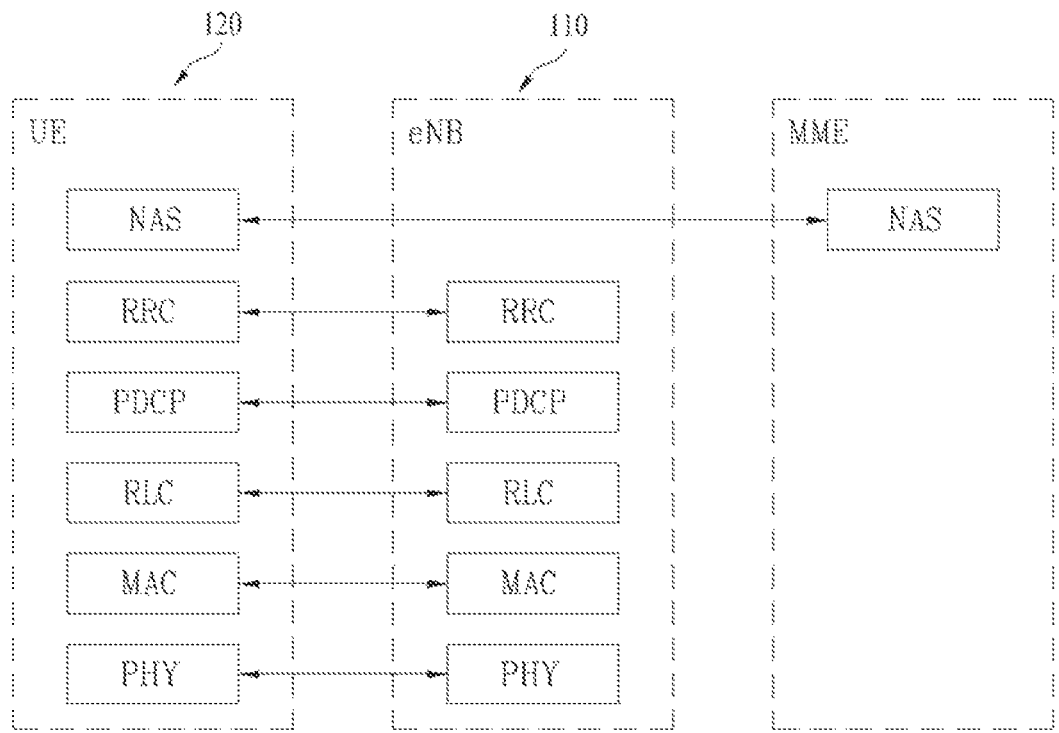
FIG. 2 is a diagram of structures of control and user planes of a radio interface protocol between a user equipment and E-UTRAN based on 3GPP radio access network specification.
Figure 2:
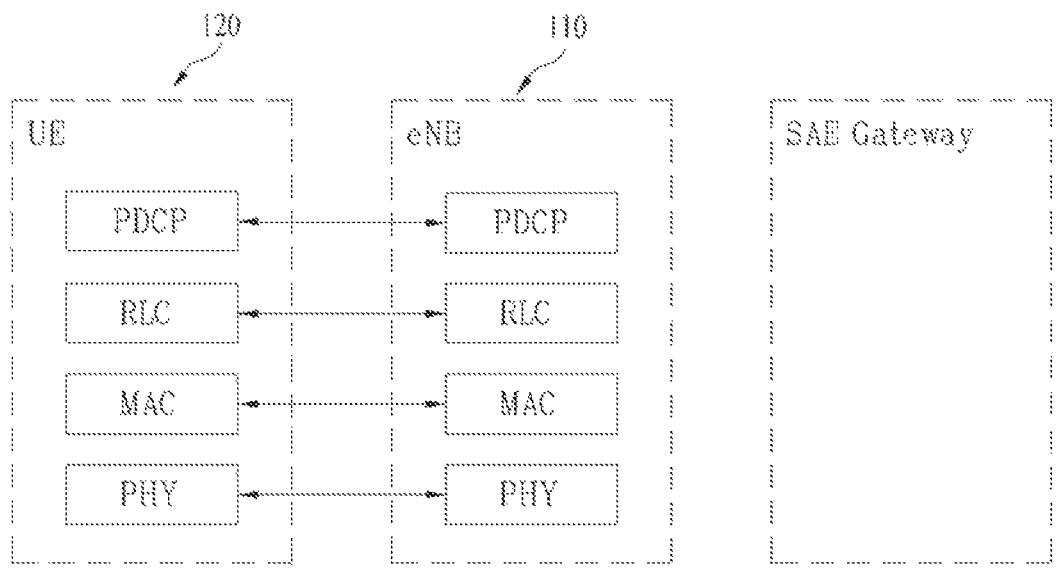

FIG. 2 is a diagram of structures of control and user planes of a radio interface protocol between a user equipment and E-UTRAN based on 3GPP radio access network specification. First of all, a control plane may mean a passage for transmitting control messages used by a user equipment and a network to mange a call. And, a user plane may mean a passage for transmitting such data generated from an application layer as voice data, internet packet data and the like.

A physical layer, i.e., a first layer, provides an information transfer service to an upper layer using a physical channel. The physical layer is connected to a medium access control layer located above via a transport channel. Data are transferred between the medium access control layer and the physical layer via the transport channel. Data are transferred between a physical layer of a transmitting side and a physical layer of a receiving side via a physical channel. The physical channel uses time and frequency as radio resources. In particular, a physical layer is modulated in downlink by OFDMA (orthogonal frequency division multiple access) scheme and is modulated in uplink by SC-FDMA (single carrier frequency division multiple access) scheme.

A medium access control (hereinafter abbreviated MAC) layer of a second layer provides a service to a radio link control (hereinafter abbreviated RLC) layer of an upper layer via a logical channel. The RLC layer o the second layer supports reliable data transfer. A function of the RLC layer can be implemented using a function block within the MAC. A packet data convergence protocol (hereinafter abbreviated PDCP) layer of the second layer performs a header compression function for reducing unnecessary control information to transmit such an IP packet as IPv4 and IPv6 in a radio interface having a narrow bandwidth.

A radio resource control (hereinafter abbreviated RRC) layer located on a lowest level of a third layer is defined in a control plane only. The RRC layer is responsible for controlling logical channel, transport channel and physical channels in association with configuration, reconfiguration and release of radio bearers (RBs). In this case, the RB means a service provided by the second layer for a data transfer between a user equipment and a network. For this, the RRC layer of the user equipment exchanges RRC messages with the RRC layer of the network. If there is an RRC connection established between RRC layers of the user equipment and the network, the user equipment may be in a connected mode. Otherwise, the user equipment may be in an RRC idle mode. NAS (non-access stratum) layer above the RRC layer may perform such a function as session management, mobility management and the like.

One cell, which constructs a base station (eNB), is set to one of bandwidths including 1.25 MHz, 2.5 MHz, 5 MHz, 10 MHz, 15 MHz, 20 MHz and the like and may then provide an uplink or downlink transmission service to a plurality of user equipments. Different cells can be set to provide different bandwidths, respectively.

A downlink transport channel for transporting data to a user equipment from a network may include one of a broadcast channel (BCH) for transporting system information, a paging channel (PCH) for transmitting a paging message, a downlink shared channel (SCH) for transmitting a user traffic or a control message and the like. A traffic or control message of a downlink multicast or broadcast service can be transmitted via a downlink SCH or a separate downlink multicast channel (MCH). Meanwhile, an uplink transport channel for transmitting data from a user equipment to a network may include one of a random access channel (RACH) for transmitting an initial control message, an uplink shared channel (SCH) for transmitting a user traffic or a control message or the like. A logical channel located above a transport channel to be mapped by a transport channel may include one of BCCH (Broadcast Control Channel), PCCH (Paging Control Channel), CCCH (Common Control Channel), MCCH (Multicast Control Channel), MTCH (Multicast Traffic Channel) and the like.

Figure 3:
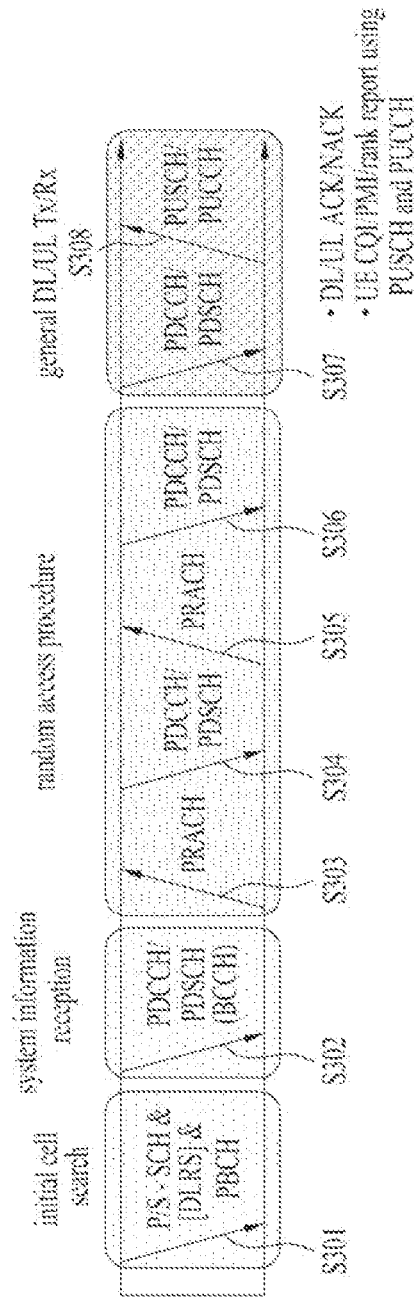
FIG. 3 is a diagram for explaining physical channels used for 3GPP system and a general method of transmitting a signal using the same.

FIG. 3 is a diagram for explaining physical channels used for 3GPP system and a general method of transmitting a signal using the same.

If a power of a user equipment is turned on or the user equipment enters a new cell, the user equipment may perform an initial cell search for matching synchronization with a base station and the like [S301]. For this, the user equipment receives a primary synchronization channel (P-SCH) and a secondary synchronization channel (S-SCH) from the base station, matches synchronization with the base station and then obtains information such as a cell ID and the like. Subsequently, the user equipment receives a physical broadcast channel from the base station and is then able to obtain intra-cell broadcast information. Meanwhile, the user equipment may receive a downlink reference signal (DL RS) in the initial cell searching step and may be then able to check a downlink channel status.

Having completed the initial cell search, the user equipment may receive a physical downlink control channel (PDCCH) and a physical downlink shared control channel (PDSCH) according to information carried on the physical downlink control channel (PDCCH) and may be then able to obtain system information in further detail [S302].

Meanwhile, if the user equipment initially accesses the base station or fails to have a radio resource for signal transmission, the user equipment may be able to perform a random access procedure (RACH) on the base station [S303 to S306]. For this, the user equipment may transmit a specific sequence as a preamble via a physical random access channel (PRACH) [S303, S305] and may be then able to receive a response message via PDCCH and a corresponding PDSCH in response to the preamble [S304, S306]. In case of contention based RACH, it may be able to perform a contention resolution procedure in addition.

Having performed the above mentioned procedures, the user equipment may be able to perform PDCCH/PDSCH reception [S307] and PUSCH/PUCCH (physical uplink shared channel/physical uplink control channel) transmission [S308] as a general uplink/downlink signal transmission procedure. Meanwhile, control information transmitted/received in uplink/downlink to/from the base station by the user equipment may include DL/UL ACK/NACK signal, CQI (channel quality indicator), PMI (precoding matrix index), RI (rank indicator) and the like. In case of the 3GPP LTE system, the user equipment may be able to transmit the above-mentioned control information such as CQI, PMI, RI and the like via PUSCH and/or PUCCH.

Figure 4:
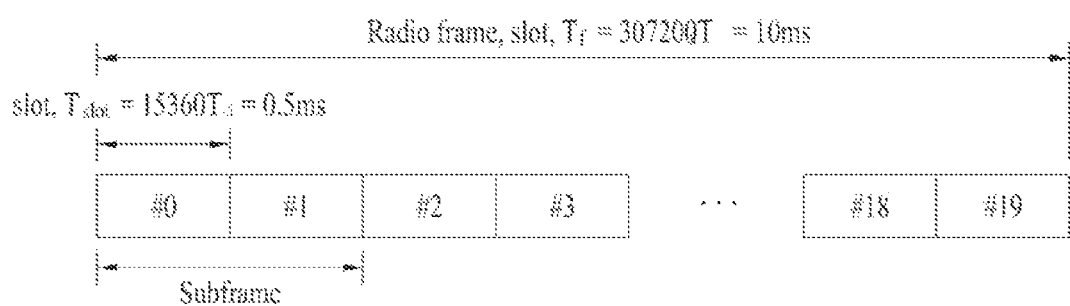
FIG. 4 is a diagram for an example of a structure of a radio frame used for LTE system.

FIG. 4 is a diagram for an example of a structure of a radio frame used for LTE system.

Referring to FIG. 4, a radio frame has a length of 10 ms ($327200 \cdot T_s$) and is constructed with 10 subframes in equal size. Each of the subframes has a length of 1 ms and is constructed with two slots. Each of the slots has a length of 0.5 ms ($15360 \cdot T_s$). In this case, $T_s$ indicates a sampling time and is expressed as $T_s=1/(15 \text{ kHz} \times 2048)=3.2552 \times 10^{-8}$ (about 33 ns). The slot includes a plurality of OFDM symbols in a time domain and includes a plurality of resource blocks (RB) in a frequency domain. In the LTE system, one resource block includes '12 subcarriers×7 or 6 OFDM symbols'. A transmission time interval (TTI), which is a unit time for transmitting data, can be determined by at least one subframe unit. The above described structure of the radio frame is just exemplary. And, the number of subframes included in a radio frame, the number of slots included in a subframe and/or the number of OFDM symbols included in a slot may be modified in various ways.

Figure 5:
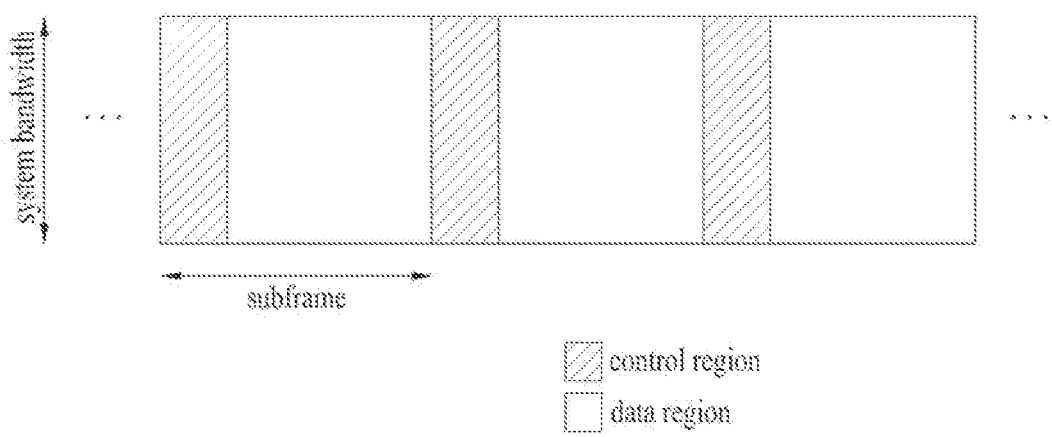
FIG. 5 is a diagram for an example of a structure of a downlink (DL) radio frame used for LTE system.

FIG. 5 is a diagram for an example of a structure of a downlink (DL) radio frame used for LTE system.

Referring to FIG. 5, a DL radio frame may include 10 subframes equal to each other in size. A subframe in 3GPP LTE system may be defined by a basic time unit of packet scheduling for all DL link frequency. Each subframe may be divided into a time interval (i.e., control region) for transmission of scheduling information and other control informations and a time interval (i.e., data region) for DL data transmission. The control region starts with a $1^{st}$ OFDM symbol and may include at least one or more OFDM symbols. A size of the control region may be set independent per subframe. The control region may be used to transmit L1/L2 (layer 1/layer 2) control signal. And, the data region may be used to transmit DL traffic.

Figure 6:
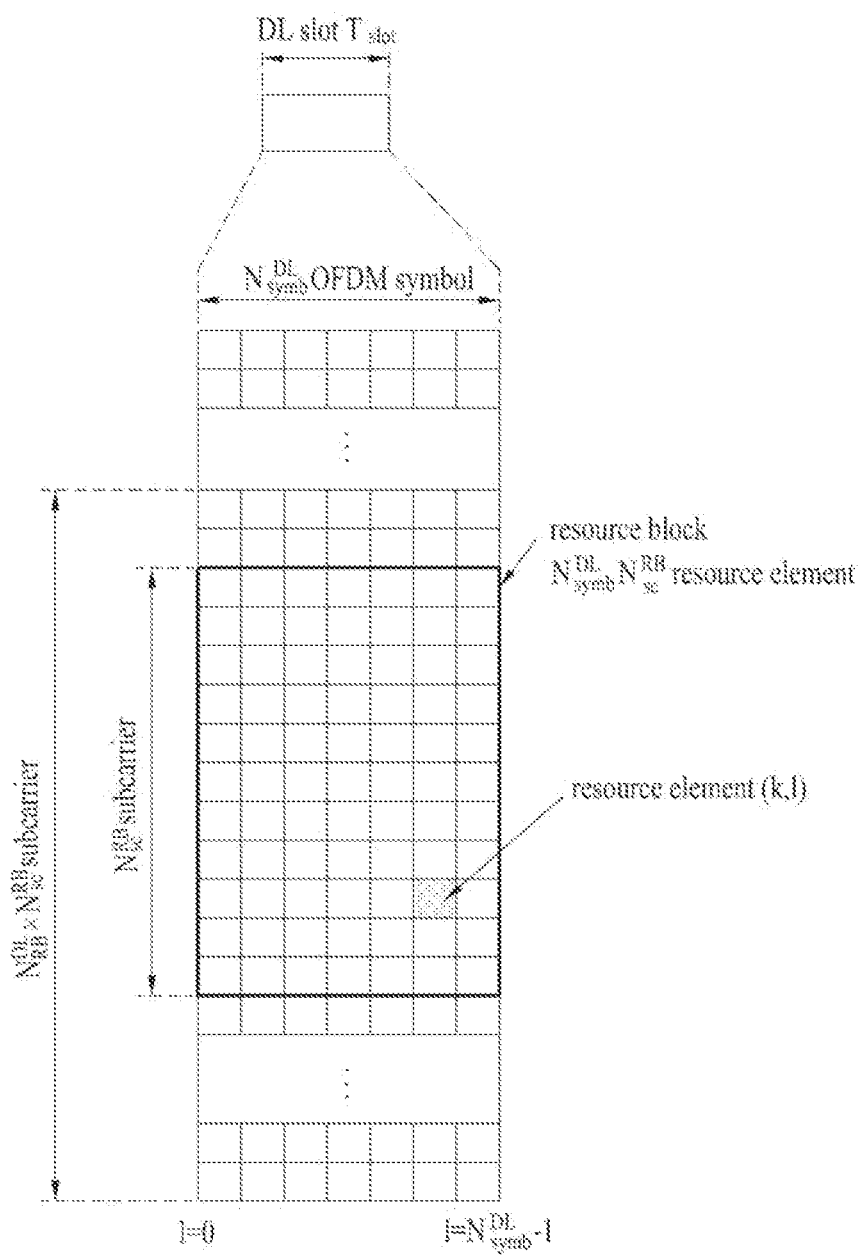
FIG. 6 is a diagram for an example of a control channel included in a control region of one subframe in a DL radio frame.

FIG. 6 is a diagram for an example of a control channel included in a control region of one subframe in a DL radio frame.

Referring to FIG. 6, a subframe may include 14 OFDM symbols. First 1 to 3 OFDM symbols may be used as a control region and the rest of 13 to 11 OFDM symbols may be used as a data region, in accordance with subframe settings. In the drawing, R1 to R4 indicate reference signals (RS) or pilot signals for antennas 0 to 3, respectively. The RS may be fixed to a predetermined pattern in a subframe irrespective of the control region or the data region. The control region may be assigned to a resource, to which the RS is not assigned, in the control region. And, a traffic channel may be assigned to a resource, to which the RS is not assigned, in the data region. Control channels assigned to the control region may include PCFICH (Physical Control Format Indicator CHannel), PHICH (Physical Hybrid-ARQ Indicator CHannel), PDCCH (Physical Downlink Control CHannel) and the like.

Figure 7:
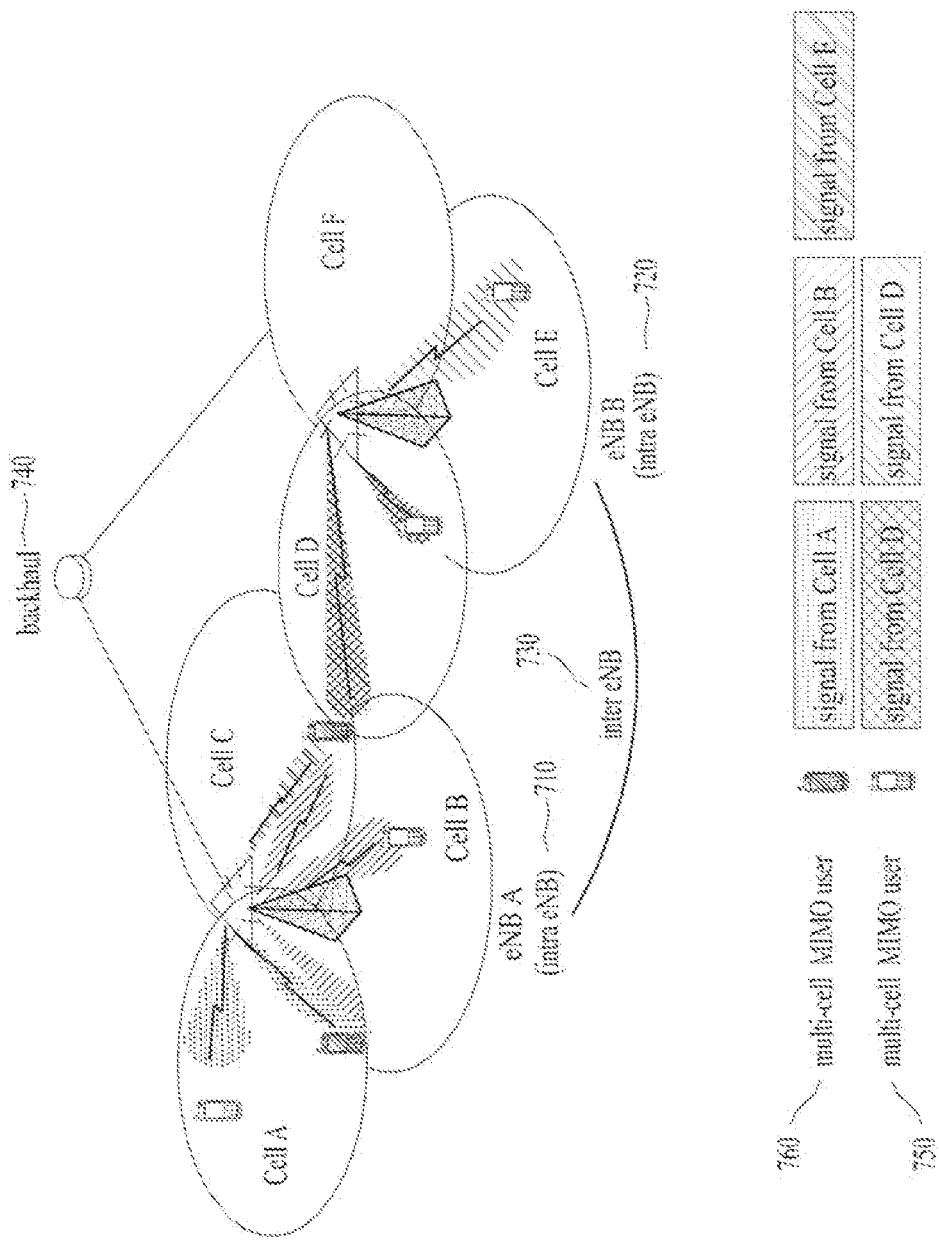
FIG. 7 is a conceptional diagram for CoMP (coordinated multi-point) scheme of an intra base station (intra eNB) and an inter base station (inter eNB) according to a related art.

FIG. 7 is a conceptional diagram for CoMP (coordinated multi-point) scheme of an intra eNB and an inter eNB according to a related art.

Referring to FIG. 7, intra base stations 710 and 720 and an inter base station 730 exist in a multi-cell environment. In LTE (long term evolution) system, an intra base station is constructed with several cells (or sectors). Cells belonging to a base station having a specific user equipment belong thereto have relation as the intra base stations 710 and 720 with the specific user equipment. In particular, cells belonging to the same base station of the cell having a user equipment belong thereto are the cells corresponding to the intra base stations 710 and 720. And, cells belonging to other base stations become the cells corresponding to the inter base station 730.

Thus, cells based on the same base station of a specific user equipment are physically co-located, they may share information (e.g., data, channel state information (CSI), etc.) with each other. Yet, cells based on another base station may be able to exchange inter-cell information via a backhaul 740 and the like. Referring to FIG. 7, a single cell MIMO user 750 within a single cell may communicate with one serving base station in one cell (or sector). A multi-cell MIMO user 760 located on a cell boundary may be able to communicate with a plurality of serving base stations in a multi-cell (or multi-sector).

Coordinated multi-point (CoMP) scheme (hereinafter abbreviated CoMP scheme) may include the system to improve throughput of a user located on a cell boundary by applying enhanced MIMO transmission in a multi-cell environment. If the CoMP scheme is applied, it may be able to reduce inter-cell interference in the multi-cell environment. If the CoMP scheme is used, a mobile station may be provided with a support from multi-cell base stations jointly. Moreover, each base station may be able to enhance system performance by supporting at least one or more mobile stations MS1, MS2, . . . MSK simultaneously using the same radio frequency resource. Moreover, the base station may be able to perform space division multiple access (SDMA) method based on state information of a channel between the base station and the mobile station. Operating modes of the CoMP scheme can be categorized into a joint processing mode of a coordinated MIMO type through data sharing and a CS/CB (coordinated scheduling/coordinated beamforming) mode.

In a wireless communication system having the CoMP scheme applied thereto, a serving base station and at least one or more coordinated base stations may be connected to a scheduler via a backbone network. The scheduler may be able to operate by receiving feedback of channel information on a channel state between each of the mobile stations (MS1, MS2, . . . MSK) and the coordinated base station. For instance, the scheduler may schedule information for a coordinated MIMO operation for the serving base station and the at least one coordinated base station. In particular, the scheduler may directly instruct each base station of the coordinated MIMO operation.

In the following description, the reference signal may be explained in detail. Generally, for the channel measurement, a reference signal already known to both a transmitting side and a receiving side is transmitted to the receiving side by the transmitting side. This reference signal indicates a modulation scheme as well as the channel measurement to play a role in activating a demodulating process. And, reference signals may be classified into a dedicated RS (DRS) for a base station and a specific mobile station and a common RS (CRS) for all mobile stations.

Figure 8:
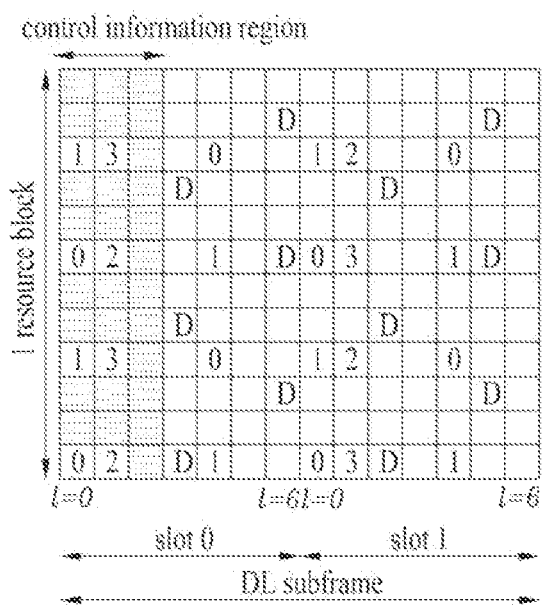
FIG. 8 is a diagram for a structure of a reference signal in LTE system supportive of DL transmission using 4 antennas.
Figure 8:
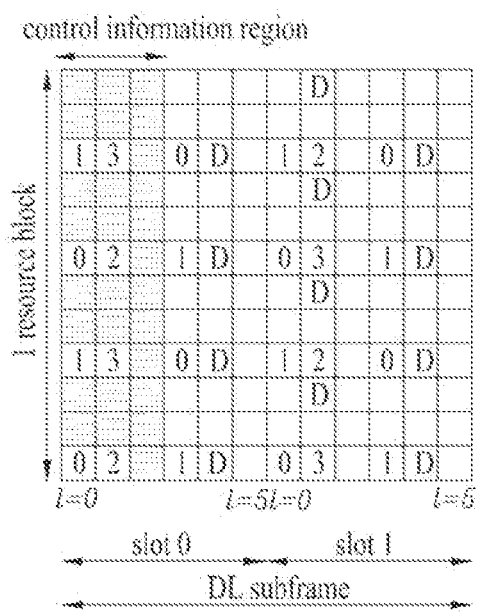

FIG. 8 is a diagram for a structure of a reference signal in LTE system supportive of DL transmission using 4 antennas. Particularly, FIG. 8(a) shows a case of a normal cyclic prefix and FIG. 8(b) shows a case of an extended cyclic prefix.

Referring to FIG. 8, 0 to 3 written in lattices may mean cell-specific CRS transmitted for channel measurement and data demodulation in a manner of corresponding to ports 0 to 3, respectively. 'D' written in a lattice may mean a UE-specific RS which is a dedicated RS and may support a single antenna port transmission via a data region, i.e., PDSCH. A user equipment receives signaling for a presence or non-presence of the UE-specific RS via an upper layer.

In a related art LTE system, for the scrambling of a reference signal and a physical channel, the reference signal us generated using a pseudo-random sequence c(n). The pseudo-random sequence c(n) may be defined as Formula 8 using a gold sequence having a length 31.

$$c(n)=(x_1(n+N_c)+x_2(n+N_c)) \bmod 2$$

$$x_1(n+31)=(x_1(n+3)+x_1(n)) \bmod 2$$

$$x_2(n+31)=(x_2(n+3)+x_2(n+2)+x_2(n+1)+x_2(n)) \bmod 2 \quad \text{[Formula 8]}$$

In Formula 8, $N_c$ is 1600 and a $1^{st}$ m-sequence has an initial value of $x_1(0)$ set to 1 and $x_1(n)$ set to 0 (yet, n is 1~30). An initial value of a $2^{nd}$ m-sequence is defined as $c_{init}=\Sigma_{i=0}^{30} x_2(i) \cdot 2^i$ and its value may be determined in accordance with a usage of the corresponding sequence.

In a cell-specific reference signal, the $c_{init}$ may be defined as Formula 9 and may be initialized for each OFDM symbol.

$$c_{init}=2^{10} \cdot (7 \cdot (n_s+1)+l+1) \cdot (2N_{ID}^{cell}+1)+2 \cdot N_{ID}^{cell}+N_{CP} \quad \text{[Formula 9]}$$

In Formula 9, the $n_s$ indicates a slot number in a radio frame and the $N_{ID}^{cell}$ indicates a cell ID. The $N_{CP}$ has a value of 1 for a normal CP and has a value of 0 for an extended CP.

In MBSFN reference signal, the $c_{init}$ may be defined as Formula 1. And, In the MBSFN reference signal, the $c_{init}$ may be initialized for each OFDM symbol.

$$c_{init}=2^9 \cdot (7 \cdot (n_s+1)+l+1) \cdot (2 \cdot N_{ID}^{MBSFN}+1)+N_{ID}^{MBDFN} \quad \text{[Formula 10]}$$

In Formula 10, the $N_{ID}^{MBSFN}$ may be signaled to a user equipment via an upper layer.

Finally, in a UE-specific reference signal, the $c_{init}$ may be defined as Formula 11 and may be initialized at a start point of a subframe.

$$c_{init}=(\lfloor n_s/2 \rfloor+1) \cdot (2N_{ID}^{cell}+1) \cdot 2^{16}+n_{RNTI} \quad \text{[Formula 11]}$$

In Formula 11, the $n_{RNTI}$ may specifically have a different value according to an application. In particular, SPS-RNTI is used for a semi-persistent transmission) or C-RNTI may be used for a non-semi-persistent transmission.

Meanwhile, DM-RS may be a reference signal used to decode data received by a user equipment from a base station. The base station transmits the DM-RS by applying the same matrix applied to data. Therefore, the DM-RS is a UE-specific reference signal and may be generated using a pseudo-random sequence c(n) as show in Formula 12.

$$r_{n_s}(m) = \frac{1}{\sqrt{2}}(1-2\cdot c(2m)) + j\frac{1}{\sqrt{2}}(1-2\cdot c(2m+1)), \quad \text{[Formula 12]}$$
$$m = 0, 1, \ldots, 12N_{RB}^{PDSCH}-1$$

A reference signal sequence shown in Formula 12 may be applicable to a single-cell single-user MIMO transmission, a single-cell multi-user MIMO transmission, a multi-cell single-user MIMO transmission and a multi-cell multi-user MIMO transmission all.

The present invention may propose that the initial value $c_{init}$ of the $2^{nd}$ m-sequence used for the pseudo-random sequence generation in Formula 12 is separately defined to be applicable to MIMO transmission modes. In particular, as shown in Formula 11, the $c_{init}$ proposed by the present invention may be characterized in having factors set to cell $N_{ID}^{cell}$ and $n_{RNTI}$ and further including a scramble discriminating parameter $N_{DRS}$ as a factor.

In this case, if a cell-specific reference signal and a DM-RS co-exist in the same OFDM symbol, the $N_{DRS}$ may be set to a value of 1. Otherwise, the $N_{DRS}$ may be set to a value of 0. And, the $N_{DRS}$ may be separately signaled from a base station via DCI format 2B received on PDCCH. Moreover, the $N_{ID}^{cell}$ may mean a cell ID or a group ID of a user group in a multi-cell multi-user MIMO mode.

Finally, regarding $n_{RNTI}$, SPS-RNTI may be used for semi-persistent transmission or C-RNTI may be usable for a non-semi-persistent transmission. Yet, the $n_{RNTI}$ may be set to 0 in accordance with a multiplexing scheme of DM-RS.

In LTE system, when there are 2 antenna ports for DM-RS transmission, if a multiplexing scheme is frequency division multiplexing, $c_{init}$ may be defined as Formula 13.

$$C_{init}=N_{DRS}2^{30}+(\lfloor n_s/2 \rfloor+1)\cdot(2N_{ID}^{cell}+1)\cdot 2^{16}+n_{RNTI} \quad \text{[Formula 13]}$$

Moreover, regarding the $c_{init}$ for supporting a single-cell multi-user MIMO mode transmission, if a multiplexing scheme for an antenna port is frequency division multiplexing, the $n_{RNTI}$ may be set to 0 to define the $c_{init}$.

$$C_{init}=N_{DRS}2^{30}+(\lfloor n_s/2 \rfloor+1)\cdot(2N_{ID}^{cell}+1)\cdot 2^{16} \quad \text{[Formula 14]}$$

$$C_{init}=N_{DRS}2^{14}+(\lfloor n_s/2 \rfloor+1)\cdot(2N_{ID}^{cell}+1). \quad \text{[Formula 15]}$$

$$c_{init}=N_{DRS}+(\lfloor n_s/2 \rfloor+1)\cdot(2N_{ID}^{cell}+1)\cdot 2^{16} \quad \text{[Formula 16]}$$

In the CoMP scheme, it may be preferable that the NZ" is set to indicate a serving cell ID for CoMP transmission. Hence, Formula 12 may be modified into Formula 17.

$$c_{init}=N_{DRS}2^{30}+(\lfloor n_s/2 \rfloor+1)\cdot(2N_{ID}^{serving\ cell}+1)\cdot 2^{16}n_{RNTI} \quad \text{[Formula 17]}$$

Likewise, if a multiplexing scheme for an antenna port is frequency division multiplexing, the $n_{RNTI}$ may be set to 0 to define the $c_{init}$ as Formulas 18 to 20.

$$c_{init}=N_{DRS}2^{30}+(\lfloor n_s/2 \rfloor+1)\cdot(2N_{ID}^{serving\ cell}+1)\cdot 2^{16} \quad \text{[Formula 18]}$$

$$c_{init}=N_{DRS}2^{14}+(\lfloor n_s/2 \rfloor+1)\cdot(2N_{ID}^{serving\ cell}+1) \quad \text{[Formula 19]}$$

$$c_{init}=N_{DRS}+(\lfloor n_s/2 \rfloor+1)\cdot(2N_{ID}^{serving\ cell}+1)\cdot 2^{16} \quad \text{[Formula 20]}$$

For a multi-cell multi-user MIMO transmission in the CoMP scheme, the $N_{ID}^{cell}$ is set to $N_{ID}^{MU}$ indicating a serving cell ID of CoMP transmission or an ID of a UE group to define the $c_{init}$ as Formula 21 to 23.

$$c_{init}=N_{DRS}2^{30}+(\lfloor n_s/2 \rfloor+1)\cdot(2N_{ID}^{MU}+1)\cdot 2^{16} \quad \text{[Formula 21]}$$

$$c_{init}=N_{DRS}2^{14}+(\lfloor n_s/2 \rfloor+1)\cdot(2N_{ID}^{MU}+1) \quad \text{[Formula 22]}$$

$$c_{init}=N_{DRS}+(\lfloor n_s/2 \rfloor+1)\cdot(2N_{ID}^{MU}+1)\cdot 2^{16} \quad \text{[Formula 23]}$$

Particularly, in Formulas 21 to 23, if the $N_{ID}^{MU}$ is an ID of a serving cell, a reference signal may be set as a cell-specific reference signal. If the $N_{ID}^{MU}$ is an ID of a UE group, a reference signal may be set as a UE-specific reference signal.

Figure 9:
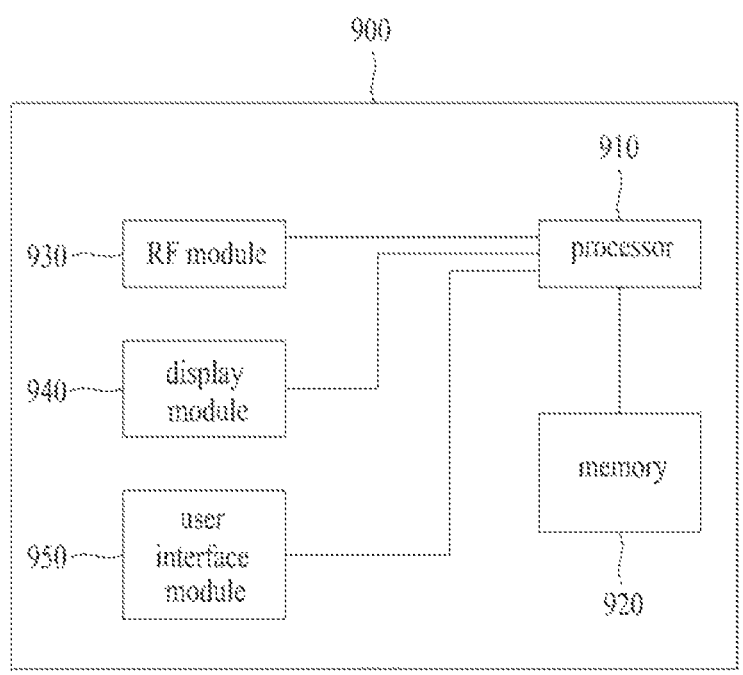
FIG. 9 is an exemplary block diagram of a user equipment according to one embodiment of the present invention.

FIG. 9 is an exemplary block diagram of a user equipment according to one embodiment of the present invention.

Referring to FIG. 9, a user equipment 900 may include a processor 910, a memory 920, an RF module 930, a display module 940 and a user interface module 950.

The user equipment 900 is illustrated for clarity and convenience of the description and some modules thereof may be omitted. Moreover, the user equipment 900 may be able to further include at least one necessary module. And, some modules of the user equipment 900 may be further divided into sub-modules. The processor 910 may be configured to perform operations according to the embodiment of the present invention exemplarily described with reference to the accompanying drawings.

In particular, the processor 190 may perform operations required for multiplexing a control signal and a data signal. And, the detailed operations of the processor 910 may refer to the contents described with reference to FIGS. 1 to 8.

The memory 920 may be connected to the processor 910 and may store operating systems, applications, program codes, data and the like. The RF module 930 may be connected to the processor 910 and may perform a function of converting a baseband signal to a radio signal or a function of converting a radio signal to a baseband signal. For this, the RF module 930 may perform analog conversion, amplification, filtering and frequency uplink transform or inverse processes thereof. The display module 940 may be connected to the processor 910 and may display various kinds of informations. The display module 940 may include such a well-known component as LCD (Liquid Crystal Display), LED (Light Emitting Diode), OLED (Organic Light Emitting Diode) and the like, by which the present invention may be non-limited. The user interface module 950 may be connected to the processor 910 and may include a combination of well-known interfaces including a keypad, a touchscreen and the like.

The above described embodiments correspond to combination of elements and features of the present invention in prescribed forms. And, it is able to consider that the respective elements or features are selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. It is apparent that an embodiment can be configured by combining claims, which are not explicitly cited in-between, together without departing from the spirit and scope of 'what is claimed is' or that those claims can be included as new claims by revision after filing an application.

In the present disclosure, embodiments of the present invention may be described centering on the data transmission/reception relations between a relay node and a base station. In this disclosure, a specific operation explained as performed by a base station may be performed by an upper node of the base station in some cases. In particular, in a network constructed with a plurality of network nodes including a base station, it is apparent that various operations performed for communication with a terminal can be performed by a base station or other network nodes except the base station. In this case, 'base station' may be replaced by such a terminology as a fixed station, a Node B, an eNode B (eNB), an access point and the like. And, a terminal may be replaced by such a terminology as UE (User Equipment), MS (Mobile Station), MSS (Mobile Subscriber Station) and the like.

Embodiments of the present invention may be implemented using various means. For instance, embodiments of the present invention can be implemented using hardware, firmware, software and/or any combinations thereof. In case of the implementation by hardware, one embodiment of the present invention may be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, one embodiment of the present invention may be implemented by modules, procedures, and/or functions for performing the above-explained functions or operations. Software code may be stored in a memory unit and may be then drivable by a processor. The memory unit may be provided within or outside the processor to exchange data with the processor through the various means known to the public.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

Industrial Applicability

As mentioned in the foregoing description, although a method of generating a reference signal sequence in a multi-antenna wireless communication system and apparatus therefor are described mainly with reference to examples applied to 3GPP LTE system, the present invention may be applicable to various kinds of multi-antenna wireless communication systems as well as the 3GPP LTE system.

What is claimed is:

1. A method for transmitting a UE (User Equipment) specific reference signal sequence at a base station in a wireless communication system, the method comprising:

generating the UE specific reference signal sequence based on a pseudo-random sequence (c(n)); and transmitting the UE specific reference signal sequence to a UE, wherein the pseudo-random sequence is defined by the following equation 1, $$c(n)=(x_1(n+N_C)+x_2(n+N_C))\mod 2$$

$$x_1(n+31)=(x_1(n+3)+x_1(n))\mod 2$$

$$x_2(n+31)=(x_2(n+3)+x_2(n+2)+x_2(n+1)+x_2(n))\mod 2,$$
where $N_c=1600$  <equation 1> and a first m-sequence ($x_1(n)$) is initialized with $x_1(0)=1$, $x_1(n)=0$, $n=1, 2, \ldots, 30$, wherein a second m-sequence ($x_2(n)$) is initialized with $k+(\lfloor n_s/2 \rfloor+1) \cdot (2N_{ID}^{cell}+1) \cdot 2^{16}$ where $n_s$ is a slot number within a radio frame, $N_{ID}^{cell}$ is a cell identity, and k is a scrambling identity.

2. The method according to claim 1, wherein the UE specific reference signal sequence (r(m)) is defined by the following equation 2, $$r(m) = \frac{1}{\sqrt{2}}(1 - 2 \cdot c(2m)) + j\frac{1}{\sqrt{2}}(1 - 2 \cdot c(2m+1)),$$  < equation 2 >

$$m = 0, 1, \ldots, 12N_{RB}^{PDSCH} - 1, \text{ where } N_{RB}^{PDSCH}$$

is a number of resource blocks allocated to a PDSCH (Physical Downlink Shared CHannel).

3. The method according to claim 1, wherein the scrambling identity (k) is transmitted to the UE through a PDCCH (Physical Downlink Control CHannel).

4. The method according to claim 1, wherein information on the scrambling identity (k) is included in a DCI (Downlink Control Information) format 2B associated with a PDSCH (Physical Downlink Shared CHannel).

5. The method according to claim 1, wherein the scrambling identity (k) is one or zero.

6. The method according to claim 1, wherein the UE specific reference signal sequence is transmitted via two antenna ports.

7. A base station in a wireless communication system, the base station comprising:
- a processor for generating a UE (User Equipment) specific reference signal sequence based on a pseudo-random sequence (c(n)) and
- a transmitting module for transmitting the UE specific reference signal sequence to a UE,
- wherein the pseudo-random sequence is defined by the following equation 1, $$c(n) = (x_1(n+N_C) + x_2(n+N_C)) \bmod 2$$

$$x_1(n+31) = (x_1(n+3) + x_1(n)) \bmod 2$$

$$x_2(n+31) = (x_2(n+3) + x_2(n+2) + x_2(n+1) + x_2(n)) \bmod 2,$$
where $N_c = 1600$ <equation 1> and a first m-sequence $(x_1(n))$ is initialized with $x_1(0)=1$, $x_1(n)=0$, $n=1, 2, \ldots, 30$, wherein a second m-sequence $(x_2(n))$ initialized with $k + (\lfloor n_s/2 \rfloor + 1) \cdot (2 N_{ID}^{cell} + 1) \cdot 2^{16}$ where $n_s$ is a slot number within a radio frame, $N_{ID}^{cell}$ is a cell identity, and k is a scrambling identity.

8. The base station according to claim 7, wherein the UE specific reference signal sequence (r(m)) is defined by following equation 2, $$r(m) = \frac{1}{\sqrt{2}}(1 - 2 \cdot c(2m)) + j\frac{1}{\sqrt{2}}(1 - 2 \cdot c(2m+1)),$$ <equation 2>

$$m = 0, 1, \ldots, 12 N_{RB}^{PDSCH} - 1, \text{ where } N_{RB}^{PDSCH}$$

is a number of resource blocks allocated to a PDSCH (Physical Downlink Shared CHannel).

9. The base station according to claim 7, wherein the scrambling identity (k) is transmitted to the UE through a PDCCH (Physical Downlink Control CHannel).

10. The base station according to claim 7, wherein information on the scrambling identity (k) is included in a DCI (Downlink Control Information) format 2B associated with a PDSCH (Physical Downlink Shared CHannel).

11. The base station according to claim 7, wherein the scrambling identity (k) is one or zero.

12. The base station according to claim 7, wherein the UE specific reference signal sequence is transmitted via two antenna ports.

* * * * *